US009902115B1

(12) United States Patent
Janson et al.

(10) Patent No.: US 9,902,115 B1
(45) Date of Patent: Feb. 27, 2018

(54) SCALABLE AND RECHARGEABLE RECYCLER, THREE DIMENSIONAL PRINTER, INJECTION MOLDING, AND COMPUTER NUMERICALLY CONTROLLED SYSTEM

(71) Applicants: Frederick Janson, Sacramento, CA (US); Ratan Daniel, Sacramento, CA (US)

(72) Inventors: Frederick Janson, Sacramento, CA (US); Ratan Daniel, Sacramento, CA (US)

( * ) Notice: Subject to any disclaimer, the term of this patent is extended or adjusted under 35 U.S.C. 154(b) by 202 days.

(21) Appl. No.: 14/960,190

(22) Filed: Dec. 4, 2015

Related U.S. Application Data

(60) Provisional application No. 62/087,350, filed on Dec. 4, 2014.

(51) Int. Cl.
*B29C 64/00* (2017.01)
*B29C 64/35* (2017.01)
*B29C 67/00* (2017.01)
*B29B 17/00* (2006.01)
*B33Y 30/00* (2015.01)
*B33Y 40/00* (2015.01)

(52) U.S. Cl.
CPC ...... *B29C 67/0096* (2013.01); *B29B 17/0005* (2013.01); *B29C 67/0051* (2013.01); *B33Y 30/00* (2014.12); *B33Y 40/00* (2014.12)

(58) Field of Classification Search
CPC ............ B29C 67/0096; B29C 67/0051; B29C 67/0077; B33Y 30/00; B33Y 40/00; B33Y 80/00; B29B 17/00; B29B 2017/0089; B29B 2017/046; B29B 2017/0484; B29B 17/0005
See application file for complete search history.

(56) References Cited

U.S. PATENT DOCUMENTS

| 5,936,861 A * | 8/1999 | Jang | B29C 70/384 700/98 |
|---|---|---|---|
| 2006/0214335 A1* | 9/2006 | Cox | B01F 3/188 264/497 |
| 2012/0168985 A1* | 7/2012 | Klaber | B29C 67/0059 264/308 |
| 2016/0374431 A1* | 12/2016 | Tow | A43B 17/003 36/43 |
| 2017/0008127 A1* | 1/2017 | Hyatt | B23K 26/144 |

* cited by examiner

*Primary Examiner* — Alison L Hindenlang
*Assistant Examiner* — Mohamed K Ahmed Ali
(74) *Attorney, Agent, or Firm* — Mark H. Plager

(57) ABSTRACT

A scalable and rechargeable system is disclosed that recycles and repurposes a very wide range of meltable waste and/or other meltable materials, and can re-use the recycled meltable material within the system for an additive process and/or subtractive process to make 3D objects. The recycled material may be ground into homogenous and/or heterogenous grains, filaments, powders, and/or shards, which can be stored or used as feed for 3D printing, CNC machining, and/or injection molding. An embedded interface, software, and/or file management system, coupled with Wi-Fi, USB, and/or Bluetooth technologies, control the motorized machine, its machine head system, and/or reversible and lockable building deck, with storable, adjustable, embedded, and/or locking clamps, which may be configured for 3D printing, injection molding, and/or CNC machining within the same system, powered by renewable and/or non-renewable energy sources.

11 Claims, 5 Drawing Sheets

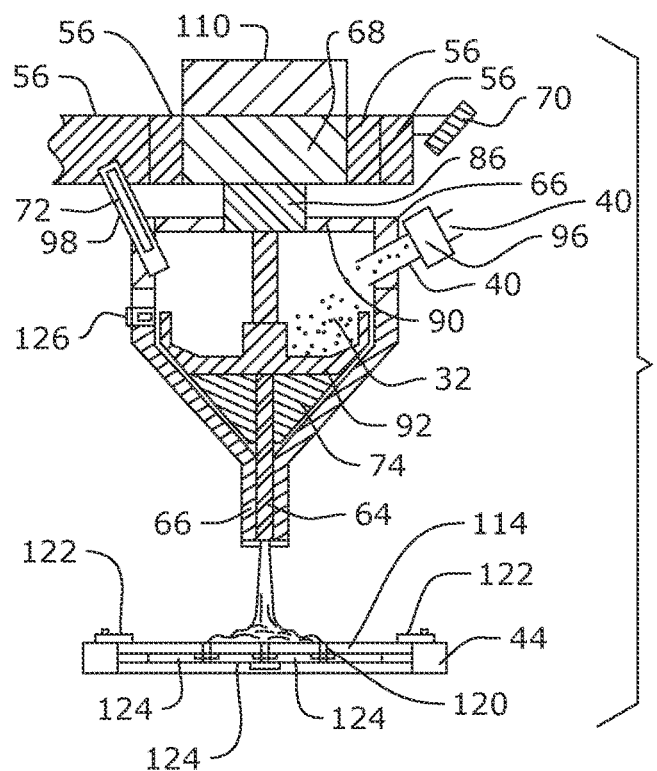
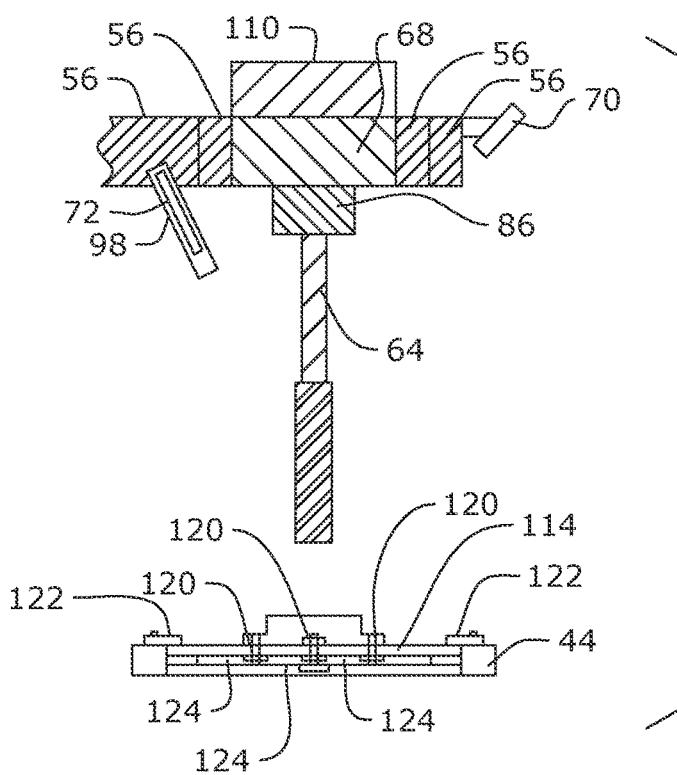

SCALABLE AND RECHARGEABLE RECYCLER, THREE DIMENSIONAL PRINTER, INJECTION MOLDING, AND COMPUTER NUMERICALLY CONTROLLED SYSTEM

CROSS-REFERENCE TO RELATED APPLICATIONS

This application claims benefit under 35 U.S.C. § 119(e) of U.S. Provisional Application having Ser. No. 62/087,350 filed Dec. 4, 2014, which is hereby incorporated by reference herein in its entirety.

BACKGROUND

The embodiments herein relate generally to recycling systems, and more particularly, to a scalable and rechargeable recycler, three dimensional ("3D") printer, injection molding ("IM"), and computer numerically controlled ("CNC") system.

3D printing and IM are additive processes, while CNC machining is a subtractive process. All are useful in manufacturing, yet 3D printing, IM, and CNC machining typically consume one-time use material(s), which in the aggregate(s) can contribute to environmental pollution, and the over-consumption of new building materials or components thereof. As can be seen there is a need for a system that can provide either or both additive and subtractive processes, useful in manufacturing, while aiding in reducing both environmental pollution and the consumption of new building materials or components thereof, by recycling. Because different users have different consumption and manufacturing needs, there is need for a system that can be scaled or built bigger or smaller to satisfy these needs. There is also a need for rechargeable and mobile systems like this system described herein, which can be powered by renewable energy sources, and/or conventional non-renewable energy sources, for use in a wider range of environments.

SUMMARY

In one aspect, a system for recycling material for reuse within the system in an additive and/or subtractive process comprises a frame; a grinder module attached to a first location of the frame, including a hopper for receiving meltable material, a grinder for grinding the meltable material into a grain, powder, shredded filament, and/or shards (collectively referred to as "grain"), and a removable container for storing the grain; a second location of the frame configured to receive the removable container; a machine head system (collectively referred to below as "MHS") configurable for additive and/or subtractive manufacturing processes; a motor control system coupled to the MHS; a software-controlled controller coupled to the motor control system for controlling positioning and/or operation of the MHS, building deck, and/or recycler; and a conduit coupling the removable container to the MHS, the conduit for supplying the grain to the MHS for additive and/or subtractive manufacturing processes on the building deck.

BRIEF DESCRIPTION OF THE FIGURES OR DRAWINGS

The detailed description of some embodiments of the invention is made below with reference to the accompanying figures, wherein like numerals represent corresponding parts of the figures. Some and/or all of these referenced parts can be recombined in different configurations to yield alternative embodiments of the invention.

FIG. 9 is a cross-sectional front view taken perpendicular to the direction of the arrow head in line 9-9 of FIG. 8, illustrating a 3D printer and an IM configuration of the MHS.

FIG. 10 is a cross-sectional front view, illustrating a CNC configuration of the MHS, with the extruder funnel detached, over a building deck with the CNC building material clamps revealed and employed about a CNC building block.

DETAILED DESCRIPTION OF THE FIGURES OR DRAWINGS

In general, embodiments of the present disclosure, provide a rechargeable system that may recycle a wide range of meltable material(s), and may re-use the recycled meltable material(s) within the system for 3D additive and/or 3D subtractive processing, a system which can be built or scaled smaller or larger to accommodate different user needs. In the exemplary embodiments, the additive process is 3D printing, and/or IM; and the subtractive process is CNC machining. The meltable recyclables and/or other meltable material(s) may be ground into a grain, which can then be used as building material feed for 3D printing, CNC machining, and/or IM—which may be used for manufacturing a 3D article or object. The descriptions of the embodiments of the invention herein, coupled with FIGS. 1 through 10, are collectively representative of embodiments of the invention, and as such, may collectively be referred to in general herein as the "system". A MHS 42 and/or deck 44 may be configured in the system for use in the additive and/or subtractive processes. As will be appreciated, the system makes use of what would otherwise be waste products contributing to global pollution, and instead re-purposes the meltable recyclable material(s) and/or other meltable material(s), into useful end products, in addition to reducing the need for new, unused, and/or expensive building materials or consumables for creating 3D articles or objects.

FIGS. 1 through 9 are exemplary embodiments of the system, and pertain to the additive processing configurations of the system, including the 3D printing and IM configurations of the MHS 42 (FIG. 4) and/or the FIG. 9 deck 114 (embedded in deck 44, and locked by four pivoting locks/arms 122 about the reversible building deck 114, pivoting from the worker's building deck 44).

FIG. 10 is an exemplary embodiment of the system, as it pertains to subtractive processing configurations of the system, including for example, the CNC machining configurations of the MHS 42 and/or the reversible and lockable deck 114.

Figure 1:
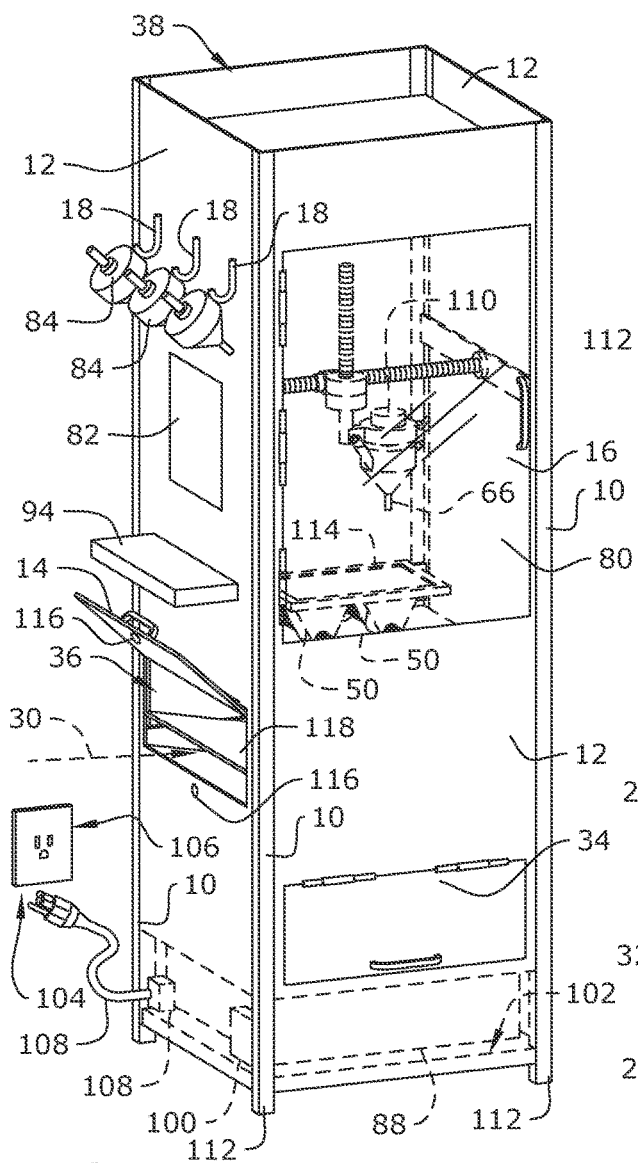
FIG. 1 is a perspective front view of a meltable material recycler system with 3D printing, injection molding, and/or CNC machining according to an embodiment of the subject disclosure.

FIG. 1, FIG. 4, FIG. 9, and FIG. 10 illustrate the first of two fundamental differences between the system's additive and subtractive processing configurations, where the MHS 42 extruder funnel 66 (FIG. 9), and associated MHS 42 threaded lid 90 (FIG. 9), for use in additive processing functionality, may be removed in FIG. 10, to allow for subtractive processing functionality. To make the change from additive to subtractive processing configurations, the extruder funnel 66 may be unscrewed from the MHS 42 threaded lid 90. The lid 90 may screw onto a thread about the exterior base of the MHS 42 drill bit clamp 86 (FIG. 9). Once unscrewed from the base of the drill bit clamp 86 (FIG. 9), the threaded lid 90, and the threaded extruder funnel 66, which can screw together to form a chamber, may be collectively stored on storage hooks 18 (FIG. 4), which may employ a storage ring 126 attached to extruder funnel 66, and typically also store with an unclamped drill bit 64, for the purpose of having a dedicated lid 90, funnel 66, and drill bit 64 complex 84 (FIG. 1), for dedicated use with different homogenous meltable recyclable and/or other meltable materials. The complex 84 arrangement permits one to not have to clean or cross-contaminate lid 90, funnel 66, and drill bit 64 when using the system with more than one homogenous melting material over the system's useful life, so that each homogenous melting material type would typically have a dedicated melting complex 84 (FIG. 1), composed of a dedicated lid 90, dedicated funnel 66, and dedicated drill bit 64, a complex 84 which may be collectively stored on hooks 18, when other meltable materials 30 are being employed for additive processing, other than the homogenous meltable material that the complex 84 is dedicated to. Similarly, ground homogenous grain 32 in many different collection containers 20 may be removed from compartment 26 and stored for future homogenous or dedicated use. For the system's subtractive processing configuration, dedicated drill bit(s) 64 and/or other CNC machining tools that fit in the drill bit clamp 86, may be used and/or stored on/in the small external box, cabinet, and/or shelf/shelves 94, generally depicted in FIG. 4 and FIG. 1, attached to the system's panel components 12 (FIG. 1), which may be attached to the system's frame components 10 (FIG. 1). The second of the two fundamental differences between the system's additive and subtractive processing configurations, may do with the position of the reversible and lockable building deck 114 (FIG. 9 and FIG. 10), embedded and locked into the worker's building deck 44 (FIG. 9 and FIG. 10). The lockable building deck 114 is locked by pivoting locks/arms 122 (FIG. 9 and FIG. 10) which pivot from the worker's deck 44, over the reversible deck 114. Here, the additive processing configuration, per FIG. 9, may store and conceal the separate adjustable toothed-screw clamp(s) 120 (FIG. 9 and FIG. 10) embedded in deck 114 for typical use with CNC machining (FIG. 10), where each clamp 120 may be found on separate and differently-oriented tracks 124, within one side of the reversible building deck 114, one track 124, for each adjustable toothed-screw clamp 120, which otherwise, when in CNC configuration, may collectively be revealed, employed, adjusted, screwed down, and/or clamped about blocks of recycled material made by the system and/or other CNC building materials, for CNC machining (FIG. 10). The adjustable screw clamps 120 employed in CNC machining configuration (FIG. 10) may be concealed or stored by the additive processing configuration (FIG. 9), by flipping over and locking the reversible building deck 114, storing the adjustable screw clamps 120, which may be stored in fitted voids, grooves, or tracks within the worker's deck 44 during the additive processing configuration, locked down by locks/arms 122. An alternative embodiment may employ the screw clamps 120 and tracks 124, embedded in deck 114, for use with IM. In another embodiment, IM cast(s) may be placed on deck 114 and under the funnel 66 spout, to be filled by the molten meltable materials 74, derived from the additive processing configuration.

Figure 2:
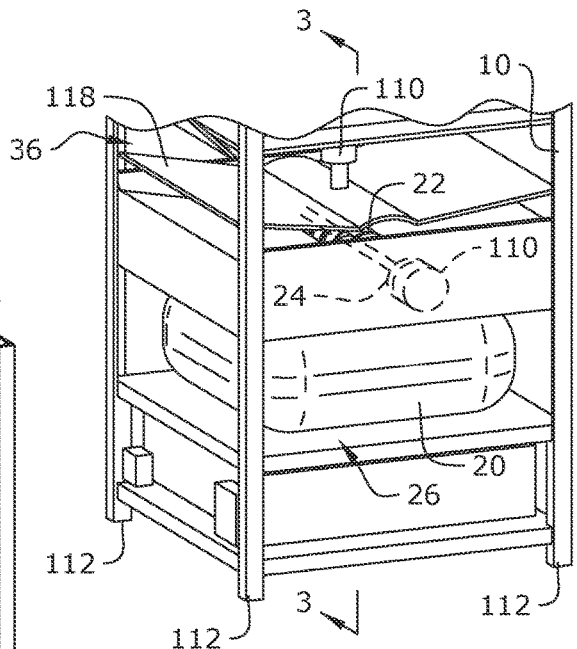
FIG. 2 is a partial, perspective internal view of a bottom section of the system of FIG. 1 with panels and doors removed according to an embodiment of the subject disclosure.
Figure 3:
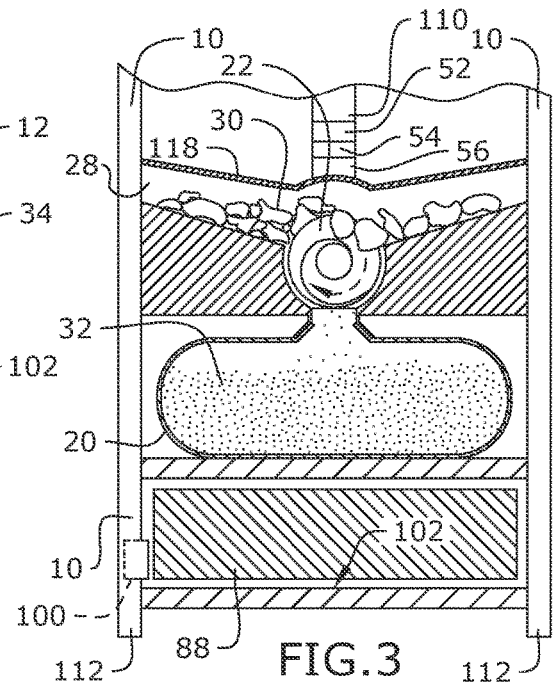
FIG. 3 is a cross-sectional front view taken perpendicular to the direction of arrow head of line 3-3 of FIG. 2.

FIG. 1, FIG. 2, and FIG. 3 show an exemplary embodiment of the system's recycling configuration, where typically homogenous meltable recyclable materials 30 (for example, metal(s), glass, plastic(s), ceramics, asphalt, concrete, minerals, and/or rocks) may be washed and/or collected for recycling, and then fed into the grinder/hopper compartment 28 (FIG. 3) through the grinder/recycler door 14, and not into the compression plate 118 compartment 36 (FIG. 1 and FIG. 2) through the grinder/recycler door 14. The compression plate 118 may be lowered onto the material 30, and typically not onto the plate 118 itself, illustrated by an arrow. FIG. 3 illustrates where materials 30 may be received within compartment 28.

FIG. 1 illustrates that door 14 may have software-controlled near-coupling magnetic sensors and a safety lock mechanism complex 116, which may only allow the axis of the jagged grinder wheels 22 (FIG. 3), rotated by the grinder motor 24 (FIG. 2), driven by a dedicated motor driver 110 (FIG. 2), to operate or rotate when the two magnetic sensors may be within one inch of one another, effectively when door 14 is down, closed, and locked, and when the grinder is activated using the system's user interface and monitor controlling complex 82 (FIG. 1). Otherwise, if door 14 is ajar, the grinder motor 24, and dedicated motor driver 110, and thus the grinder, may be deactivated, by cutting the power to the motor driver and grinder motor, as a safety feature to typically prevent grinder-related hand and/or other injuries. Similarly, once the grinder 22 is activated, door 14 may not be opened until the grinder rotations come to a full stop, at which point the grinder door 14 may be opened. Once the grinder door 14 is closed and locked by the coupling sensors and safety lock complex 116, and once the grinder is activated at/by the user interface control 82, the meltable material 30 may be ground down into grain 32 (FIG. 3) by the activated grinder 22, in coordination with the grinder/hopper-fitted compression plate 118, attached to an ascending and/or descending Y axis docking unit 56, about a Y axis threaded/non-threaded shaft 54, ascended and/or descended by the rotation of the Y axis shaft 54 by a Y axis motor 52, governed by a dedicated motor driver 110 attached to the ceiling of compartment 36 (FIG. 2), connected like all other dedicated motor drivers of the system to a breakout board 100, which is powered like all other energy source dependent system parts by an internal and/or external renewable and/or non-renewable energy source, as follows.

The system and its components may be powered by the system's power cord and plug 108 (FIG. 1) and/or by the optional rechargeable battery 88 (FIG. 3), which may be held by the battery rack 102 (FIG. 3). In some embodiments, the system may be configured to use a renewable energy source and includes a renewable energy power source interface 106 (FIG. 1). It will be understood that the interface 106 may be integrated onto the system or may be separable/distinct and plugged into with plug 108. As will be appreciated, the rechargeable battery pack 88 and the renewable energy power source interface 106 provide power self-sufficiency allowing the system to be mobile and untethered to an electrical grid. Accordingly, embodiments of the system may be powered and recharged by renewable and/or non-renewable energy sources 104 (FIG. 1) via the power cord and plug 108. The internal components of the system may be configured to provide additive and/or subtractive manufacturing processes as described in more detail below. To facilitate or govern recycling and additive and/or subtractive processes, a software-controlled panel and monitor 82 may provide a user interface to control the operation and/or movement of the system's components, and/or to add, delete, store, and/or modify (via embedded operating system, USB, Bluetooth, Wi-fi, and/or other technologies) the system's software, and/or related 3D manufacturing software, and/or designs. Once the meltable material is ground into a grain 32 by the grinder 22 and plate 118, the grain 32 may be collected below the grinder/hopper compartment 28 in a removable container 20 located in a collection compartment 26, which may readily be accessed through door 34 (FIG. 1).

Figure 4:
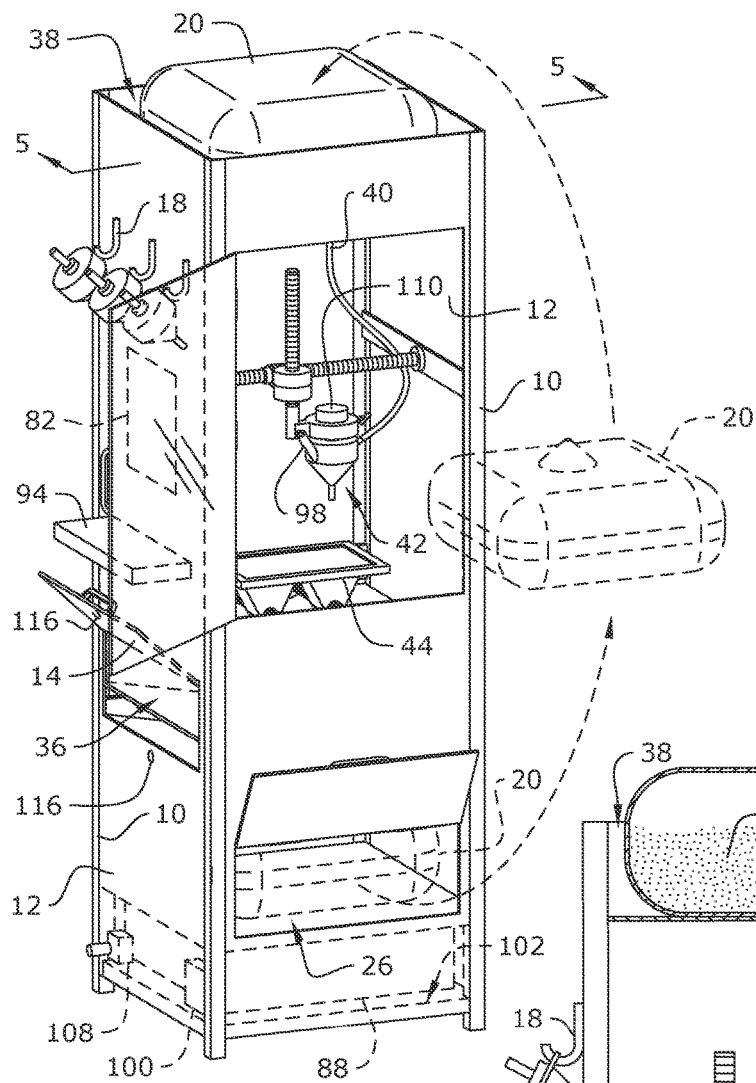
FIG. 4 is a perspective front view of the system of FIG. 1 illustrating a change in position of a container of recycled material for use in 3D printing, IM, and/or CNC machining processes and/or processing.
Figure 5:
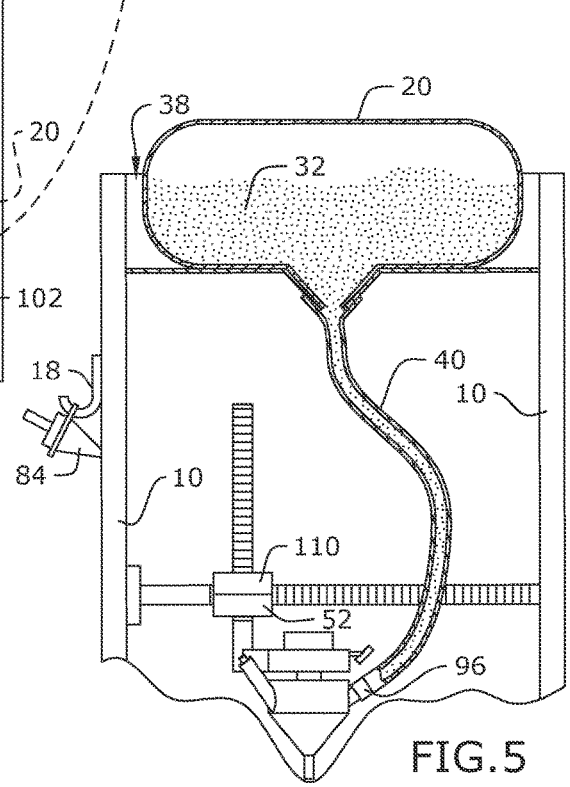
FIG. 5 is a partial cross-sectional front view and top section view taken perpendicular to the direction of the arrow head of the line 5-5 of FIG. 4, illustrating the connection of a container of recycled material, to a conduit, which connects to a MHS.
Figure 6:
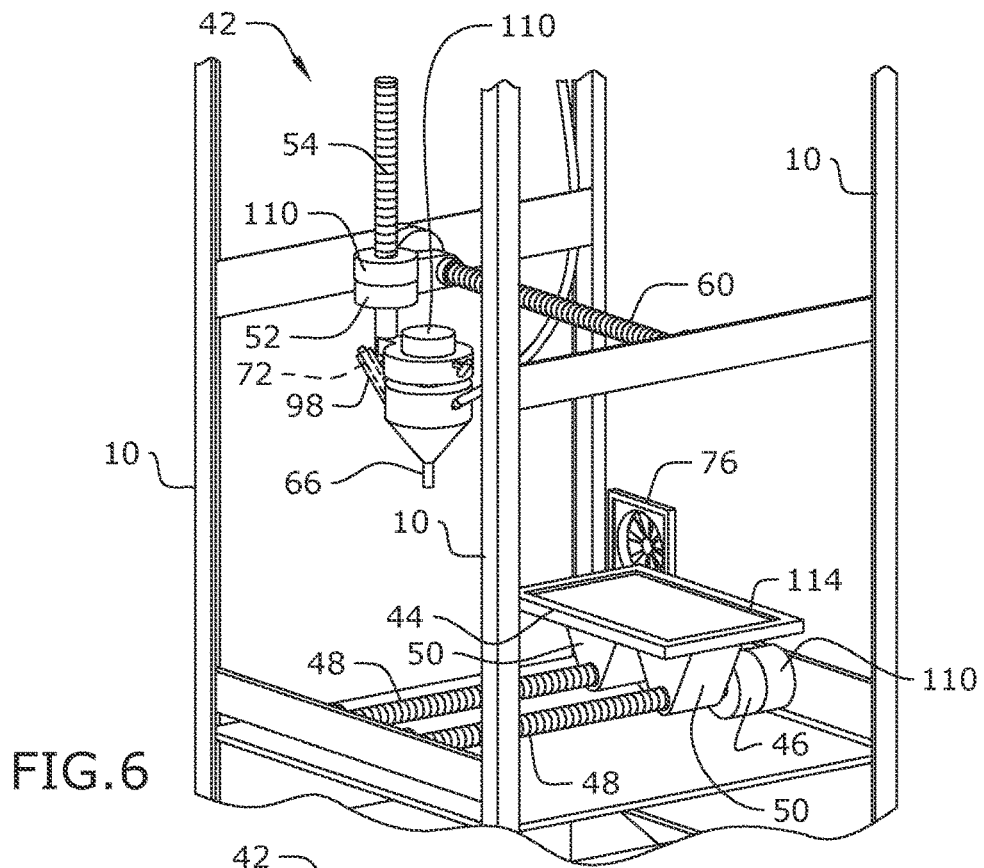
FIGS. 6-7 show a partial, front, perspective view of the interior of the system, and more particularly, a motor control of a MHS and building deck in different positions, according to an embodiment of the subject disclosure.
Figure 7:
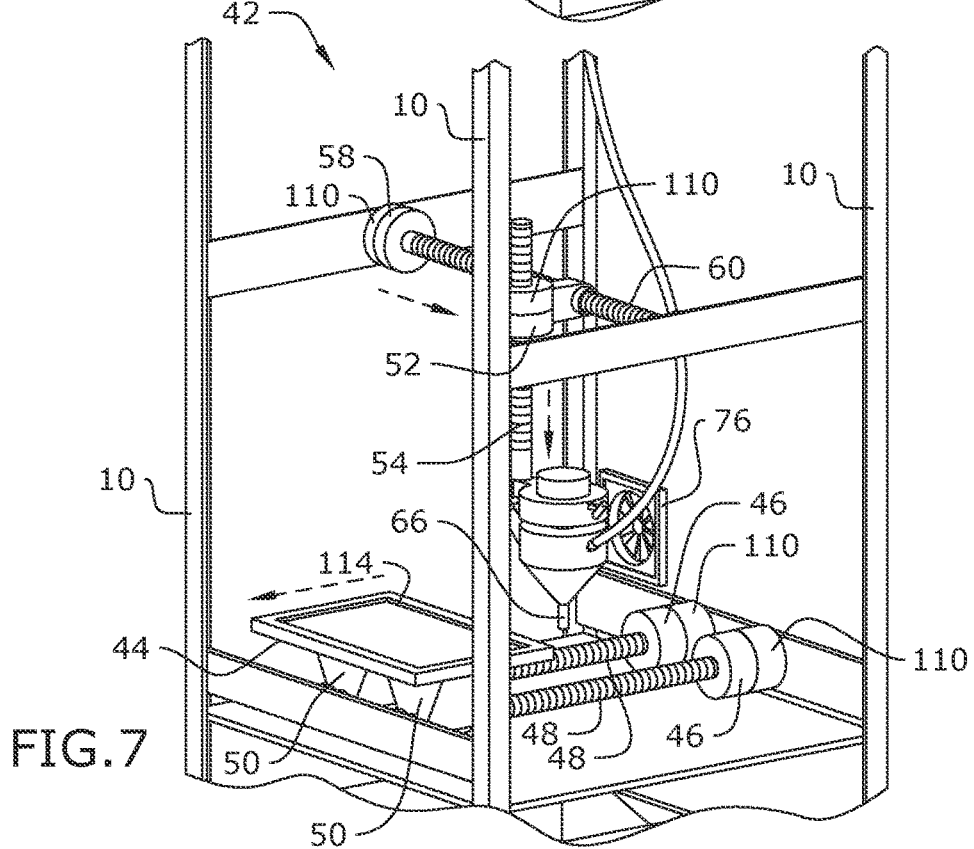

FIG. 4 illustrates, once the removable container 20 is removed as indicated by the arcing upwards motion in FIG. 4, it may be positioned in the removable container support rack 38 (FIG. 4 and FIG. 5), and coupled with the grain conduit 40 (FIG. 5) connected to and/or flowing from support rack 38 floor/hopper to the software-controlled valve 96, feeding MHS 42 (FIG. 4) funnel 66 (FIG. 9).

FIGS. 1 and 4 through 8, detail the positioning of MHS 42 (FIG. 4), and/or the worker's deck 44 (and embedded reversible deck 114). The MHS 42, and/or building deck 44, may be software-controlled by interface 82 for operation along three axes (x,y,z). Alternative embodiments may allow for different combinations of the MHS 42 and building deck 44 along these three axes. The interface controller 82 may be electrically connected to a breakout board 100 for controlling operation of the following elements. In some embodiments, the MHS 42 may be coupled to x (58), y (52) and z (46) axes motors and each of their dedicated drivers 110 controlling movement along a y-axis threaded/unthreaded shaft 54 using y-axis motor 52 and an x-axis threaded/unthreaded shaft 60 using x-axis motor 58 for movement in two directions. A building deck 44 (on docking unit(s) 50) may be coupled to a z-axis shaft(s) 48 and z-axis motor(s) 46 for movement in a third direction. The interface controller 82 and/or its associated software(s) and/or 3D object design file(s) may coordinate the operation of the drivers 110, to move the x (58), y (52) and z (46) axes motors, to change the position of the x (62), y (56), and z (50) docking units, to precisely position the MHS 42 and/or building deck 44 in such a coordinated manner as to facilitate the manufacturing of 3D printed, CNC machined, and/or IM designs objects on the smaller reversible building deck 114, locked into and embedded into the larger building deck 44 (FIGS. 9 and 10), based on 3D printing, CNC, and/or IM software(s), design(s), file(s), and/or cast(s) respective specifications.

Figure 8:
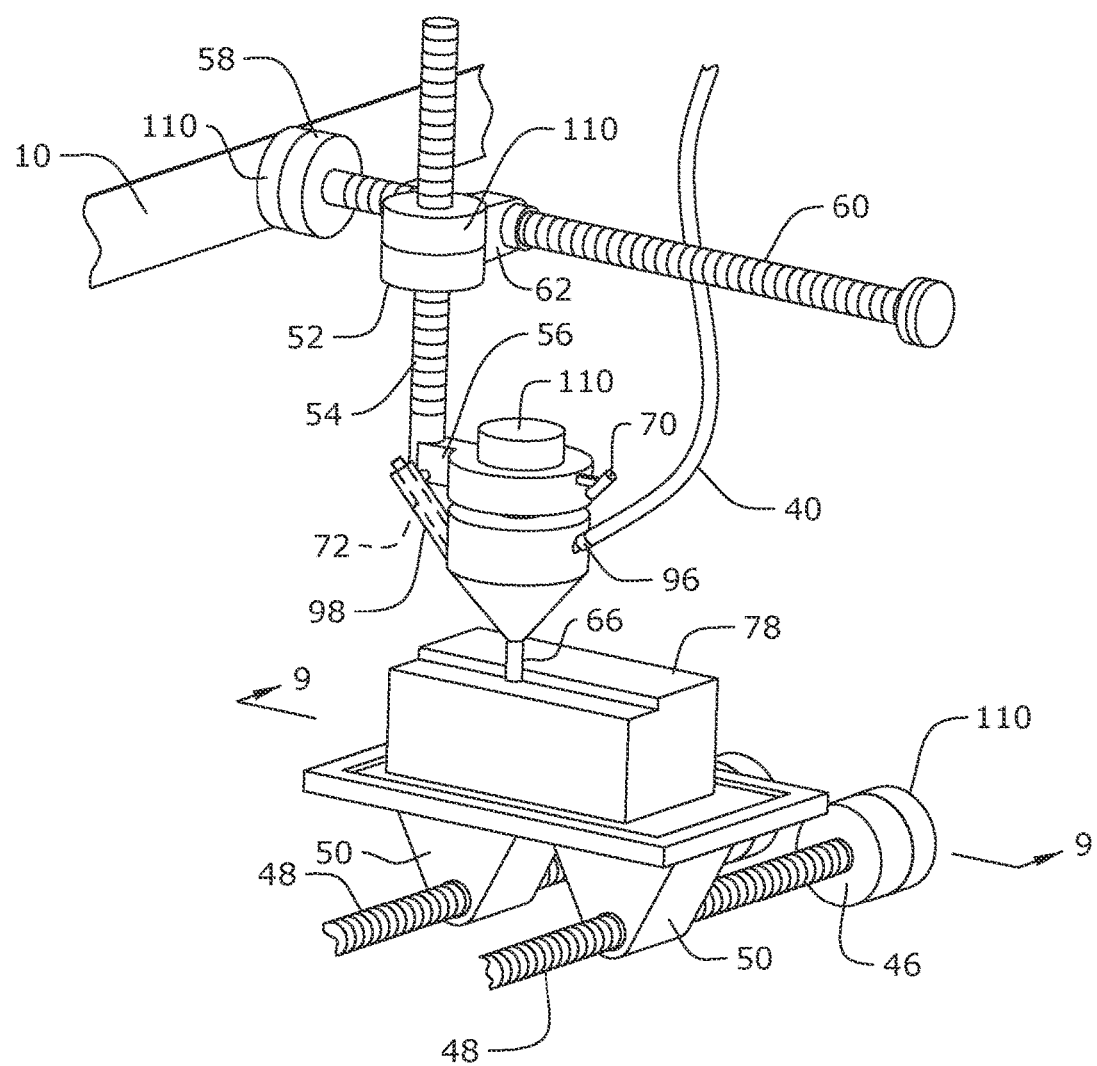
FIG. 8 is a partial, enlarged, perspective, front view, of the MHS and building deck of FIGS. 6-7.

Referring to FIGS. 5-10, details of the system's MHS 42 and/or building deck 44 are described in the context of a 3D printer system, CNC machine, and IM. Pertaining to the function of MHS 42 in 3D printing, CNC machining, and IM processes, the conduit's 40 software-controlled opening/closing valve 96, may in coordination with the control interface 82 and temperature sensor 70 of funnel 66, optimally feed grain 32 from container 20, into a side opening of the MHS 42 funnel 66 of complex 84, onto the mechanical filter 92, a filter 92 which may be fitted and fixed/welded to, and/or designed into the inside of funnel 66, to prevent mechanical filter 92 from spinning when drill bit 64 may be activated during molten material 74 extrusion, and where drill bit 64 fits/penetrates through funnel 66 and filter 92, stopping just short of the semi-sealed spout at the bottom of the funnel 66, which may have an aperture of any desired diameter, where a larger aperture diameter may result in faster 3D printing times, and decreased print quality and resolution, and where a smaller aperture diameter may result in the opposite. The funnel 66 may be combined with the MHS 42 threaded chamber lid 90 to form a semi-sealed melting chamber, super-heated by laser 72 in collaboration with temperature sensor 70, interface 82, and its associated software and files, where funnel 66 may be screwed onto lid 90 about the drill bit clamp 86, a clamp 86 which may hold the drill bit 64 for 3D printing and/or IM additive process molten material extrusion, and/or CNC machining for subtractive processes. In some embodiments, a funnel 66 (for releasing heated grain 32) and/or other components of the system, may be built out of highly refractory and/or temperature-resisting materials, such that funnel 66 may be adapted to temperatures in the 50-6000+° F. temperature range, when directly and/or indirectly heated by a high energy source (depicted here by a laser 72), which may be covered by a secondary (laser) eye safety shield 98, a half pipe about laser 72, where both shield 98, laser 70, and temperature sensor 70 may be connected to docking unit 56, and where shield 98 may further block the direct viewing of the laser 72, in addition to shield 80 on door 16. By employing highly refractory and/or temperature-resistant materials to build funnel 66, lid 90, drill bit 64, drill bit clamp 86, and/or any other part of the system, the system may melt most of the most common types of homogenous and/or heterogenous recyclable and meltable garbage and/or other meltable materials (processed into the grain 32) into free building materials for 3D objects, for example 78 (FIG. 8). A temperature sensor 70 may monitor the temperature of funnel 66, in collaboration with drill bit 64, motor 68, and valve 96, so that the grain 32 may achieve a continuous molten feed source 74, which may run through filter 92, for drill bit 64 and funnel 66 extrusion onto deck 114 for 3D printing, IM, and/or for making blocks for CNC machining purposes, when configured to do the same, and as specified and/or controlled by controller 82 and/or associated software and/or files. A fan and/or air conditioner-like cooling system 76 on the frame 10 may be used to control or lower the temperature in the system. As will be appreciated, the user no longer has to purchase expensive filament but may instead use common recyclable material to create many functional articles of manufacture.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for recycling material for reuse within the system in an at least one of an additive and a subtractive process, comprising:

a frame;
a machine head system including a clamp, the machine head system coupled to the frame and movable within an interior volume of the frame, the machine head system including:
  a first machine head being attachable to the clamp and configured to perform additive manufacturing processes when attached to the clamp, and
  a second machine head swappable with the first machine head and configured to perform subtractive manufacturing processes when attached to the clamp;
a motor control system coupled to the machine head system;
a controller coupled to the motor control system for controlling positioning and operation of the machine head system;
a grinder module attached to a first location of the frame, including:
  a hopper for receiving recycled meltable materials,
  a grinder for grinding the recycled meltable materials into a grain, and
  a removable container disposed to collect the grain from the grinder when the removable container is in the first location of the frame and to store the grain;
a second location of the frame configured to receive the removable container; and
a conduit coupling the removable container from the second location of the frame to the machine head system, the conduit for supplying the grain to the first machine head for additive and subtractive recycling and manufacturing processes.

2. The system of claim 1, wherein the first machine head is configured for additive and subtractive recycling and manufacturing processes.

3. The system of claim 1, wherein the second machine head is configured for CNC machining as a subtractive process.

4. The system of claim 3, wherein the second machine head includes a drill or laser for CNC machining.

5. The system of claim 1, wherein the motor control system is configured for movement along at least three axes.

6. The system of claim 1, further comprising a renewable energy power source interface.

7. The system of claim 1, further comprising a rechargeable battery pack for powering the system.

8. The system of claim 1, wherein the machine head system is configured for exchangeable receipt of a 3D printer head and a drill bit.

9. The system of claim 1, wherein the first machine head is configured for extruding melted grain.

10. The system of claim 9, further comprising a heat source to melt the grain in the first machine head.

11. The system of claim 1, further comprising a building deck positioned under the machine head system, the building deck including a reversible deck embedded into the building deck, and a clamping system, for additive and subtractive recycling and manufacturing processes.

* * * * *